US005903940A

United States Patent [19]

Völker et al.

[11] Patent Number: 5,903,940

[45] Date of Patent: May 18, 1999

[54] ADJUSTABLE MOTOR-DRIVEN HOSPITAL BED HAVING A HOUSING FOR PART OF THE BED SUPERSTRUCTURE

[75] Inventors: Heinrich Völker, Witten; Karlheinz Baumeister, Ballingen-Ostdorf, both of Germany

[73] Assignee: Volker Mobelproduktionsgesellschaft MGM, Germany

[21] Appl. No.: 08/578,612

[22] PCT Filed: May 11, 1995

[86] PCT No.: PCT/EP95/01795

§ 371 Date: Apr. 23, 1996

§ 102(e) Date: Apr. 23, 1996

[87] PCT Pub. No.: WO95/31171

PCT Pub. Date: Nov. 23, 1995

[30] Foreign Application Priority Data

| | | | |
|---|---|---|---|
| May 11, 1994 | [DE] | Germany | 44 16 689 |
| May 11, 1994 | [DE] | Germany | 44 16 690 |
| May 11, 1994 | [DE] | Germany | 44 16 688 |
| Apr. 21, 1995 | [EP] | European Pat. Off. | 95106010 |

[51] Int. Cl.[6] .......... A61G 7/012; B60B 33/02

[52] U.S. Cl. .......... 5/611; 5/600

[58] Field of Search .......... 5/600, 611, 613–618, 5/620

[56] References Cited

U.S. PATENT DOCUMENTS

| | | | |
|---|---|---|---|
| 2,747,203 | 5/1956 | Dawson . | |
| 2,819,474 | 1/1958 | Olsen . | |
| 2,827,641 | 3/1958 | Reichert et al. . | |
| 3,587,482 | 6/1971 | Wieland | 5/611 |
| 4,175,783 | 11/1979 | Pioth | 296/20 |
| 4,439,879 | 4/1984 | Werner . | |

FOREIGN PATENT DOCUMENTS

| | | |
|---|---|---|
| 0 558 108 | 9/1993 | European Pat. Off. . |
| 2 488 506 | 2/1982 | France . |
| 2 674 430 | 10/1992 | France . |
| 7 117 979 | 5/1971 | Germany . |
| 43 18 546 | 12/1984 | Germany . |
| 92 07 352 | 9/1992 | Germany . |
| 93 13 149 | 12/1993 | Germany . |
| 94 04 244 | 6/1994 | Germany . |

*Primary Examiner*—Alexander Grosz
*Attorney, Agent, or Firm*—Morgan & Finnegan, LLP

[57] ABSTRACT

A bed, more particularly a hospital bed comprises a bedstead (1), preferably with casters (12) and a bed superstructure (2) mounted in the bedstead (1) in a vertically adjustable manner, with a preferably adjustable bed frame. In order to ensure that such a bed with a simple structure may have a pleasing appearance, the head part and/or the foot part of the bed superstructure (2) is provided respectively with at least one downwardly directed telescoping rod (15), which runs respectively in an associated telescopic guide of the bedstead, the telescopic guides of the head part and respectively of the foot part being respectively surrounded by one piece of cladding (9 and 10).

27 Claims, 14 Drawing Sheets

ADJUSTABLE MOTOR-DRIVEN HOSPITAL BED HAVING A HOUSING FOR PART OF THE BED SUPERSTRUCTURE

FIELD OF THE INVENTION

The invention relates to a bed and more particularly to a hospital bed comprising a bedstead and a bed superstructure mounted on the bedstead in a vertically adjustable manner and having a preferably adjustable bed frame.

BACKGROUND OF THE INVENTION

A hospital bed of this type is disclosed in the German utility model 9,207,352.

Furthermore the U.S. Pat. No. 2,827,641 discloses a hospital bed in the case of which the bed superstructure is connected with four vertical telescoping tubes of essentially square cross section, in each of which a respective telescoping rod is arranged for longitudinal sliding movement. Each telescoping rod is provided with a caster at its lower end. By means of a motor all telescoping rods may be simultaneously extended. The motion of all four telescoping rods is however ganged so that it is impossible to change the slope of the bed superstructure.

The U.S. Pat. No. 2,747,203 discloses a hospital bed which comprises a bed superstructure with an adjustable bed frame. Both the head part of the patient support surface of the bed frame and also the foot part of the patient support surface of the bed frame are adjustable, each by means of a separate motor. The motors are connected with the bedstead.

The U.S. Pat. No. 2,819,474 discloses a similar hospital bed in the case of which also the bed frame is provided with an adjustable patient support surface, both the head part of the patient support surface and also the foot part of the patient support surface being able to be adjusted by a respective separate motor.

The prior art mechanisms for vertical adjustment involve certain disadvantages. In part very elaborately designed adjustment mechanisms are provided. In other cases the bed has a generally ugly appearance.

BRIEF SUMMARY OF THE INVENTION

One object of the present invention is to provide a vertically adjustable bed and more especially a hospital bed, which while possessing a simple structure also possesses a generally pleasing appearance.

The head part and/or the foot part of the bed superstructure is provided with at least one downwardly directed telescoping rod running in a respective associated telescopic guide of the bedstead, the telescopic guide of the head part and, respectively, of the foot part being surrounded by cladding. Accordingly the bed possesses both a simple structure and also an agreeable appearance.

The arrangement of the telescoping tubes and of the telescopic guides may also be reversed: then the head part and the foot part of the bed superstructure are each furnished with at least one downwardly extending telescopic guide, in which the associated telescoping rods of the bedstead run.

Further advantageous developments of the invention are defined in the dependent claims.

It is an advantage if the cladding is designed in the form of self-supporting cladding. In the case of designs so far known the bedstead, which carries the load bearing part, is encircled by separate cladding. On the other hand in the present case, in accordance with the advantageous further development of the invention, the cladding is designed in the form of self-supporting cladding. This self-supporting cladding simultaneously performs two functions: on the one hand the function of carrying the bed superstructure and on the other hand the function of cladding the parts necessary for vertical adjustment.

Preferably the cladding members are designed in the form of housings. It is also an advantage if the housing is designed as a housing which is closed on all sides. It is more particularly an advantage if the housing is in the form of a cast housing, and preferably as an aluminum injection casting or a magnesium injection casting. Since the housings are shut off on all sides, it is a simple matter to clean the same. This is something of particular importance, if the bed is used as a hospital bed or as a bed for home care, both for hand cleaning and also for mechanical cleaning in a cleaning apparatus or cleaning plant. Such special purpose cleaning plant for hospital beds have already been proposed. In this case the beds are placed in a cleaning chamber and automatically or manually cleaned, something which may be performed using superheated steam and/or chemical cleaning materials and/or other cleaning devices such as brushes and the like. The housing, which is closed in on all sides can be made water-tight in a simple manner. It may furthermore be designed in the form of a completely encapsulated housing. The moving telescoping rods extending out from the housing may have seals between them and the housing, for example in the form of an annular seal preferably in the form of a shaft seal. The housing, which is preferably closed on all sides may furthermore be designed as self-supporting cladding. It is an advantage moreover if the drive motor for the movement of the telescoping rod or, respectively, the telescoping rods is arranged within cladding or, respectively, within the housing. It is however also possible to arrange the drive motor outside the housing. If the bed is to be suitable for automatic cleaning, then in this case a water-tight motor must be employed.

The housing can be made in two parts. This is more especially an advantage if it is a question of a cast housing. On the mutually opposite surfaces of the two parts a housing seal may be provided, preferably by a sealing material, which is applied during assembly, as for instance silicone compound or another plastic sealant. Cast housings possess the further advantage of being able to be sealed in a simple fashion.

A further advantageous development of the invention is characterized in that the components required for the operation of the telescoping rods and any casters are arranged within the cladding or, respectively, the housing or cast housing. This means that on the one hand the exterior appearance is still further improved while on the other hand the possibility of cleaning is enhanced, since only the cladding must be cleaned and the parts located therein are no trouble. It is possible for still further parts to be installed in the cladding.

Preferably the cladding at the head end and the cladding at the foot end is connected together by at least one connecting member designed in the form of a connecting tube. This means that there is a particularly simple and light construction. The German utility model 7,117,979 discloses a traveling hospital bed, in the case of which the bedstead possesses a cast part. This cast part is however open in a downward direction, that is to say not shut off on all sides and can therefore not be simply cleaned. The cast part furthermore covers over the entire extent of the bed. It is consequently heavy, difficult to handle and difficult to manufacture and furthermore expensive. As compared with the design of the said German utility model 7,117,979 with a single large cast member, the said further development of the invention, in addition to being shut off on all sides, does offer the advantage that it is easier to produce and to assemble. The cast housings provided in accordance with the invention may be designed to be substantially lighter in weight and smaller in size. They are connected together by the connection part. The unit constituted by the cladding and housings and the connecting part may be termed an under-carriage.

The connecting parts or, respectively, connecting tubes are preferably manufactured of extruded section and more particularly of aluminum extruded section or magnesium extruded section. The employment of a connecting tube or of another connecting part with a closed cross section offers the advantage that then the entire under-carriage may be simply cleaned. Moreover, the under-carriage may be designed with a pleasing exterior shape.

In accordance with a further advantageous development the invention contemplates the provision of a force transmitting element on or in a connecting part for the setting of the casters. Such force transmitting element is preferably a shaft. It is preferably advantageous if the connecting part is designed in the form of a connecting tube. The force transmitting element is then located in the connecting tube, where it is not visible and does not get in the way of cleaning. Furthermore, it is protected against blows and dirt etc. from the outside and functional troubles are prevented.

A further advantageous development is characterized in that the telescoping rod or, respectively, the telescopic rods is or are arranged outside the line connecting the casters. Preferably the cladding or, respectively, the housing has an angled part in its terminal regions. Both possible designs are more particularly an advantage, if the casters provided on one cladding part can be set and if they are connected together by a force transmitting element. The force transmitting element is preferably designed in the form of a straight shaft. The telescoping rods are placed outside the connecting line between the casters and are accordingly outside the shaft so that the stroke of the telescoping rods is not obstructed by the shaft. Accordingly it is possible to provide the full stroke for the telescoping rods.

Preferably the connecting line between the casters is on the side of the telescoping rods facing away from the middle of the bed. In this case the cladding is outwardly angled in its terminal region as seen from above. Accordingly the rectangle described by the four casters of the bed is larger so that the surface on which the bed stands is larger and the bed is more stable than in the opposite case in which the connecting line of the casters is on the side, facing the middle of the bed, of the telescoping rods.

In accordance with a further advantageous embodiment the head part and the foot part of the bed superstructure is provided with respectively two parallel, spaced, downwardly directed telescoping rods, which run in associated telescopic guides of the bedstead. Preferably the distance of the casters from one another is larger than the distance of the telescopic guides from each other. Since respectively two telescoping rods are present, there is the advantage over a design with only one telescoping rod that the telescoping rods may be made smaller in size, something ultimately meaning that costs will be lower. Furthermore stability is increased. Because the telescoping rods and, respectively, telescopic guides are not placed over the wheels and the associated recesses in the housing, the path available for outward telescoping movement is increased, something which reduces the overall height of the bed or, for a given overall height, increases the stroke available for outward telescoping at a given overall height. Since the wheels are on the outside, stability of the entire bed is increased when wheeling the bed along and also there is also an increase the stability of the bed in the upright position.

Preferably a separate drive motor is provided both for the head part of the bed superstructure and for the foot part of the bed superstructure. Since the motors for the head part and the foot part of the bed superstructure are able to be operated separately and independently from one another, the bed superstructure may extend both horizontally and also at a slope (in the so-called Trendelenburg position).

Preferably the telescoping rods of the head part and/or of the foot part are connected together by one respective transverse member. The transverse member preferably extends substantially horizontally. The transverse member increases the stability of the arrangement.

A still further embodiment of the invention is characterized in that the telescoping rods are each provided with a lead screw drive able to be driven from a common toothed belt. Instead of this, by way of a kinematic reversal of parts, the telescopic guides may each be provided with a respective lead screw drive. Furthermore, instead of the toothed belt it is possible to provide some other flexible force transmitting element, which also ensures synchronous running of the lead screw drives, as for instance a chain. The use of such a force transmitting element offers the advantage that the drive possibility for the vertical movement of the bed superstructure may also be produced when the bed superstructure is inclined in a simple fashion and reliably, since equalization of angles is possible in a simple and reliable manner.

Preferably the casters are arranged to be locked by a locking element. The setting members for the casters are preferably arranged in the cladding. It is furthermore an advantage if all casters may be arrested and released using a single locking member. The setting member is preferably able to be operated from either side of the bed.

It is an advantage if one motor is provided for operation of the locking element or, respectively, the setting members. Preferably it is here a question of an electric motor. It is an advantage if manual operation of the locking element or, respectively, the setting members is also possible.

As part of a further advantageous development of the invention the cladding is lower in the part between the telescopic guides than the telescopic guides. For instance components may be present on the lower side of the bed superstructure without this meaning that vertical movement is reduced.

A further advantageous development is characterized in that the casters are able to be moved into a first position (wheeling position), in which they are able to be freely rotated and in a second position (locked position) in which they are locked. The motor will be preferably an electric motor. Owing to the possibility of motor-powered setting of casters handling of the hospital bed is improved.

A still further development of the invention contemplates that the casters are adapted to be brought into a third position, in which at least one caster may be wheeled while keeping its direction and in which the other casters are able to be rotated freely. The caster able to be wheeled but held to keep to its direction, is preferably in this case aligned with the longitudinal direction of the bed. This third position is then the so-called straight ahead setting, in which the bed may be wheeled along aligned with its longitudinal direction.

A further advantageous further development is characterized in that the motor is able to operate, or more particularly turn, a first force transmitting element, more particularly a shaft, such element being connected with a caster.

Preferably an operating part is provided for manually changing the position of the casters. The casters may then be set selectively manually set using the operating part or by the power of the motor. The operating part may furthermore be designed in the form of an operating lever or as a pedal or double pedal. The possibility of manual setting so created is then more particularly significant, if the motor is unable to be operated, for example because no power supply is present for operation of the motor or because the motor has a defect.

It is an advantage if the actuating part is connected with the first force transmitting element or, respectively, the shaft.

It is also an advantage if the operating part is connected with the first force transmitting, or with the shaft by a clutch. This is more particularly significant if an operating part or, respectively, an operating lever or, respectively, pedal is present for manually changing the position of the casters and if the operating part is connected with the first force transmitting or, respectively, with the shaft. Then the motor or, respectively, the parts connected with it would prevent manual adjustment of the casters; owing to the clutch the mechanical connection with the motor is interrupted and a manual adjustment of the casters is rendered possible and may be performed as desired.

Preferably the clutch possesses a first hub and a second hub which are connected allowing the possibility of disconnection. The first hub is able to be operated by the motor. The second hub operates the first force transmitting means or, respectively, the shaft. It is advantageous if the hubs are loaded by spring means toward each other.

The motor can be connected with the clutch or with its first hub by means of a transmission, as for example a spur gear wheel drive of a worm gear wheel drive.

A further possibility is characterized in that the first force transmitting element or, respectively, the shaft is connected with two casters. This means that the settings of the two casters may be ganged together in a simple fashion.

In keeping with a further advantageous feature of the invention on the head part of the bed and on the foot part thereof respectively two casters are provided, which are connected together by a respective first force transmitting element or, respectively, a shaft and further the two first force transmitting elements or, respectively, the shafts are connected by a second forcing transmitting element. All casters may then be set or turned by a single motor simultaneously. The second force transmitting element may also be designed in the form of a shaft. It may further be arranged in a tube connecting the head part of the bed with the foot part of the bed and accordingly be clad in a simple manner.

A still further development is characterized in that the telescoping rod or, respectively, the telescoping rods is or are arranged outside the connecting line between the casters. Preferably the cladding or, respectively, the housing has an angled part in terminal parts thereof. Both possibilities are then more particularly an advantage if casters provided on one cladding part may be set and if they are connected by a force transmitting element. The force transmitting element is preferably designed in the form of a straight shaft. The telescoping rods are arranged outside the connecting line between the casters and accordingly outside the shaft so that the stroke of the telescoping rods caused by the shaft is not obstructed. Accordingly it becomes possible to guarantee the full stroke of the telescoping rods.

Preferably the connecting line between the casters is on the side, which faces away from the middle of the bed, of the telescoping rods. In this case the cladding is angled in its end regions that is to say angled outward as seen from above. Accordingly the rectangle described by all four casters of the bed is larger so that the area on which the bed stands is larger and the bed is more stable than in the converse case, in which the connecting line between the casters is on the side of the telescoping rods facing the middle of the bed.

Working embodiments of the invention will now be described in detail with reference to the accompanying drawings.

DETAILED DESCRIPTION OF THE PREFERRED EMBODIMENTS

Figure 1:
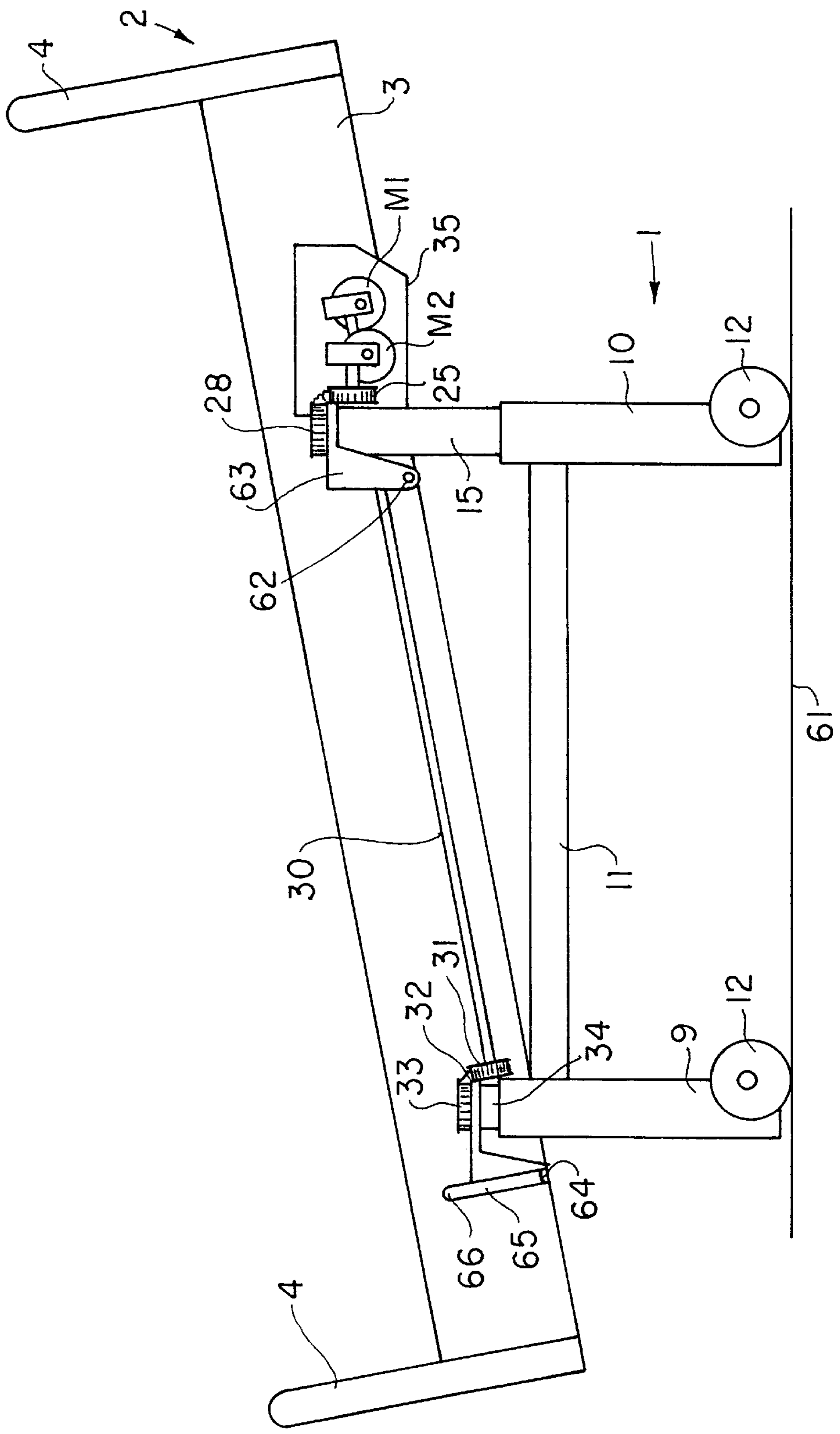
FIG. 1 shows a hospital bed in a side elevation.

The hospital bed depicted in FIG. 1 comprises a bedstead 1 and a bed superstructure 2 mounted thereon for vertical adjustment in height together with a bed frame, not illustrated in FIG. 1, which possesses a patient support surface. The bed frame 2 possesses side parts 3 (bed sides) and corner posts 4.

The bedstead 1 comprises head end cladding 9 and foot end cladding 10, such cladding parts being joined together by frames 11. On the outer ends of the cladding 9 and 10 casters 12 are provided.

The cladding 10 is represented partly in section. It has two parallel, spaced, vertical telescopic guides 13 and 14, in which a respective vertical telescoping rod 15 and 16 runs longitudinally. The telescoping rods 15 and 16 are connected together with each other at their upper ends by a horizontal transverse member 17, on which the bed superstructure 2 is rested (not illustrated in FIG. 2).

The telescoping rods 15 (and also the remaining telescoping rods) has a slip ring 18 of an anti-friction material at its lower end, such material or coating having its outer surface running against the inner surface of the telescopic guide 13. On the upper end of the telescopic guide 13 (and also of the remaining telescopic guides) a further slip ring 19 is provided, which is also manufactured of anti-friction material and has its inner surface running against the outer surface of the telescoping rod 15. In the interior of the telescoping rod 15 a lead screw 20 is provided which is able to rotate but is held against axial movement. The lead screw 20 extends through a nut 21, which is connected by a vertical sleeve 22 with the bottom 23 of the cladding 10. Accordingly the lead screw and with it the telescoping rod 15 may be moved upward and downward by rotation of the lead screw 20 in relation to the nut 21 and therefore in relation to the cladding 10.

For this purpose the transverse member 17 has an electric motor M2 attached to it, which drives a belt pulley 25 around which a toothed belt 26 is trained. The toothed belt is trained around bend pulleys 27 at its untoothed side in a direction parallel to the transverse member 17. It is trained around gear wheels 28 and 29 which are respectively connected with the telescoping rods 15 and 16 and are mounted coaxially thereon. The gear wheels 28 and 29 are able to be rotated in relation to the associated telescoping rods 15 and 16, but however are held against axial displacement. Furthermore the gear wheel 28 (and accordingly also the gear wheel 29) is connected with the associated lead screw 20 so that the rotation of the gear wheel 28 is transmitted to the lead screw 20. When the motor M2 is operated, the gear wheels 29 and 29 are driven synchronously and accordingly the telescoping rods 15 and 16 are moved synchronously upward or, in the case of the opposite direction of rotation of the motor M2, downward.

On the transverse member 17, as indicated in FIG. 1, a further motor M1 is attached, which via the connecting shaft 30 and the belt pulley 31 and furthermore the toothed belts 32 and the gear wheel 33 as well as a further gear wheel to the rear in terms of FIG. 1 moves the two parallel, vertical, spaced telescoping rods upward or downward. The cladding 9 is designed in the same manner as the cladding 10. The same applies for the associated telescoping rods, of which FIG. 1 only shows the front telescoping rod 34.

The motors M1 and M2 are accommodated or encapsulated in a sealed, water-tight housing 35. Accordingly the hospital bed may be rapidly and readily cleaned, The housing 35 is protected against sprayed or splashed water and/or against other harmful-effects of the environment.

As shown in FIG. 1, the housing 35, in which the motors M1 and M2 are encapsulated, is located on the foot part of the bed or, respectively, of the bed superstructure. Here it least interferes with the operation of the bed. Furthermore there is the added advantage linked to this that the electromagnetic fields of the electric motors are produced at a point such that the patient is not likely to be harmed by them. Because the electric motors M1 and M2 are encapsulated in a housing 35 the further advantage follows that the wiring for the electric motor M1 and M2 is simple.

The housing 35 is connected with the transverse member 17 joining the telescoping rods 15 and 16. Accordingly the housing is moved together with this transverse member 17 and therefore together with this associated foot part of the bed superstructure 2 upward and, respectively, downward.

Figure 4:
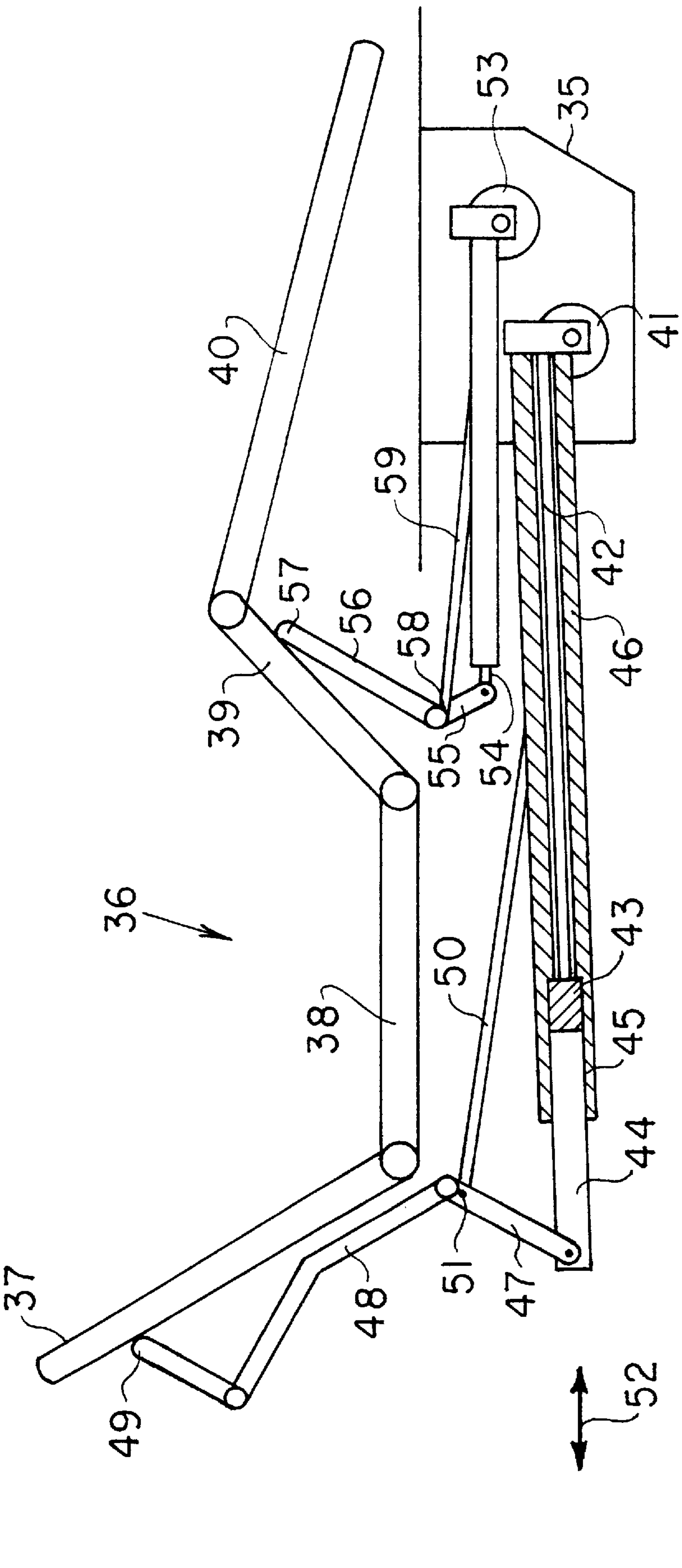
FIG. 4 shows a patient supporting insert for the hospital bed.

In FIG. 4 the patient support surface 36 in shown, which comprises four parts connected together in an articulating fashion, i. e. the head part 37, the middle parts 38 and the foot part, which for its part includes two part 39 and 40. The patient support surface 36 may for example be constituted by an array of slats or however may be in the form of intersecting bars or in some other form.

For the patient support surface 36 two possibilities of adjustment are provided for. In the housing 35 an electric motor 41 is arranged, which is adapted to turn a lead screw 42 extending through a nut 43. The nut 43 is connected with a tube 44, running longitudinally in a hole 45 in the guide tube 46. The nut 43 is connected with the guide tube 46 for longitudinal movement therein while being prevented for rotating in relation to it.

On the end of the tube 44 remote from the nut 43 the one arm 47 of a two-armed lever is pivoted, whose other arm has its outer end 49 bearing on the lower side of the head part 37. The two-armed lever 47 and 48 is pivoted on the outer end of a connecting rod 50 about a pin 51. The other end of the connecting rod 50 is connected with the electric motor 41 or, respectively, with its housing.

Owing to this arrangement the reaction forces occurring on operation of the head part 37 are not transmitted to the bed superstructure but are taken up by the connecting rod 50, which on the one hand is connected with the electric motor 41 and on the other hand with the pivot pin 51 of the two-armed lever 47 and 48. Rotation of the electric motor 41 is converted into rotation of the lead screw 42 with the result that the nut 43 and with it the tube 44 are moved in the direction of the double arrow 52. Accordingly the two-armed lever 47 and 48 is pivoted about the pin 51 so that the head part 37 of the patient support surface 36 may be pivoted upward or downward. The forces transmitted by movement of the tube 44 to the lever 47 and 48 and taking effect on the head part 37 of the patient support surface 36 are not transmitted to the bed superstructure. Instead such forces are taken up by the connecting rod 50 and transferred by same back to their point of origin so that the force transmission path is completed without affecting or including the bed superstructure and accordingly without having any effect on the bed superstructure.

The means for movement of the foot part 39 and 40 of the patient support surface 36 is designed in an analogous manner. The motor 53, which is also arranged inside the housing 35, turns a lead screw, which extends through a nut, which is connected with a tube 54. At the other end of the tube 54 one arm 55 of a two-armed lever is attached, whose other lever arm 56 has its end 57 bearing against the lower side of the part 39, which faces the middle part 38 of the patient support surface 36, of such-patient support surface 36. The two-armed lever 55 and 56 is pivoted for turning about a pin 58. The connecting rod 59 is joined at one end with the pivot pin 58 and at its other end is connected with the electric motor 53.

As shown in FIGS. 1 and 4, all electric motors M1, M2, 41 and 53 are arranged inside the same water-tight housing 35. As already described supra, such housing 35 is connected with the transverse member 17. Since the housing 35 and with it the electric motors M1, M2, 41 and 53 together with the bed superstructure move upward and, respectively, downward, the adjustment of the head part 37 and of the foot part 39 and 40 of the patient support frame is possible without any difficulties using the associated electric motors 41 and 53 to reach any desired height setting of the bed superstructure 2.

Figure 2:
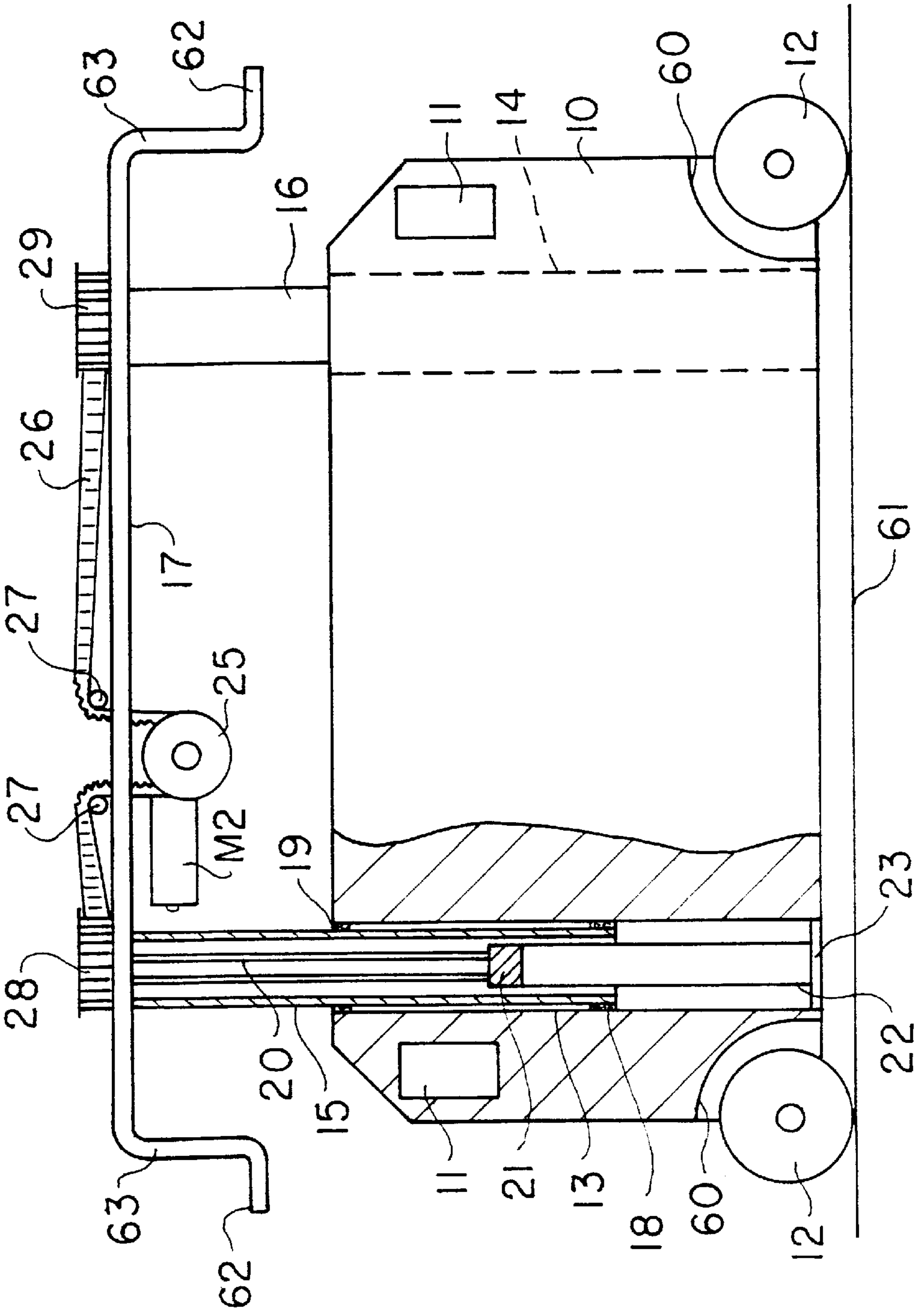
FIG. 2 shows the hospital bed of FIG. 1 in a front view.

As shown in FIG. 2, the distance of the casters 12 from one another is larger than the distance between the telescopic guides 13 and 14 or, respectively, the distance between the telescoping rods 15 and 16. The telescopic guides 13 and are accordingly arranged in the cladding, 10 with the casters 12 and the recesses 60 provided for them. Accordingly it is possible so reduce the overall height necessary for the cladding 10. The telescopic guides 13 and 14 may consequently reach a considerable distance downward and almost as far as the floor 61, on which the casters 12 rest.

All electric motors M1, M2, 41 and 53 are able to be operated independently from each other. Since the electric motors M1 and M2 are able to be operated independently from each other, the bed superstructure 2 may be set obliquely as depicted in FIG. 1. The bed superstructure 2 is pivotally mounted on the foot end of the bed about the pivot pin 62. The pivot pin 62 is connected with the transverse member 17. It can be constituted by horizontal extensions, which are provided at the lower ends of side parts 63 (see also FIG. 2) connected with the transverse member 17.

At the head end the bed superstructure 2 is pivotally mounted in a similar manner about a pivot pin 64 provided on the transverse member here. For compensation of the change in length on pivoting the bed superstructure 2 in relation to the horizontal setting on the pivot pin 64 an upwardly directed pivot lever 65 is pivoted, whose top end is pivoted on the side part 3 of the bed superstructure 2 about a pivot pin 66.

Vertical adjustment of the head end of the bed superstructure 2 is reliably provided in the case of the slope indicated in FIG. 1 as well, since the toothed belt 32 will transmit force from the belt pulley 31 to the gear wheels 33 even in the sloping position.

There are seals between the output shafts of the motors M1 and M2 and the housing 35, which may be a plastic housing. All drive motors are supplied from a battery or an accumulator, which is also arranged inside the housing 35. A built in transformer is not required so that the disadvantages accompanying same (heating effect, radiation, connection with the electrical supply) will not occur. The hospital bed is completely free of the supply line voltage. If an accumulator is utilized, it can be charged using a battery charger, which is located outside the bed and is not connected with the bed, for example socket mounted charging device with a rating of for example 15 VA, which can be connected with the hospital bed for charging up only occasionally.

Figure 3:
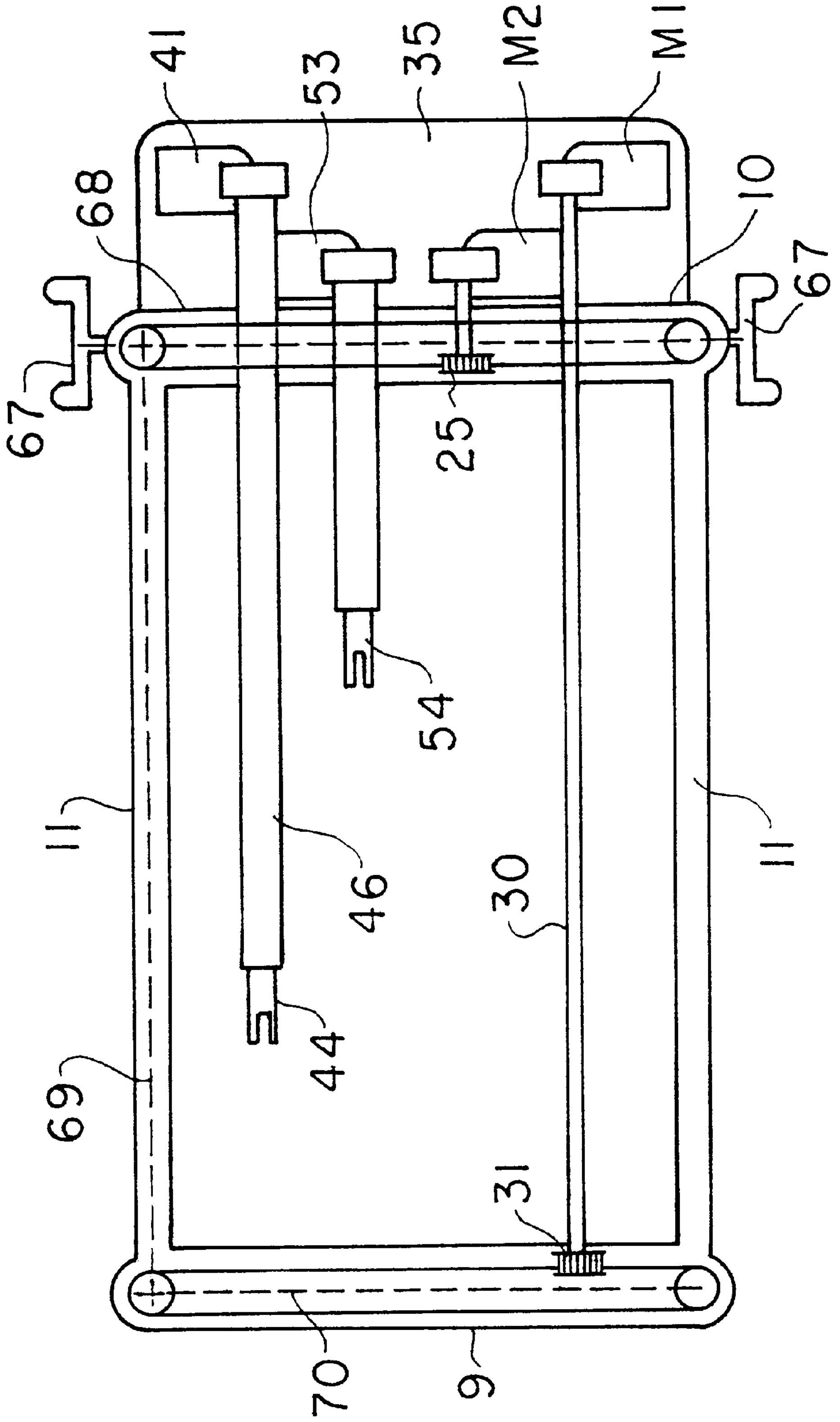
FIG. 3 shows the hospital bed in a diagrammatic plan view.

All casters 12 are able to be locked or, respectively, arrested using a single arresting device, which is able to be operated from either side of the bed using the pedals 67 as shown in FIG. 3. The pedals 67 are connected with a first brake rotary shaft 68, by which the casters 12 at the foot end of the bed can be arrested. Transmission of force to the head part is performed by means of a brake rotary rod 69, which is accommodated in a frame connection 11. The brake rotary rod 69 is connected with the brake rotary shaft 70 in the cladding 9 at the head end of the bed.

If no oblique setting (Trendelenburg setting) of the bed superstructure 2 is desired, the bed frame is to be moved upward or, respectively, downward into the horizontal setting. Accordingly a device for synchronization of vertical movement of the head part and of the foot part is provided. The telescopic tube 15 or 16 or the transverse member 17 is connected with a control device 71. The control device 71 is located at a distance a from the telescopic tubes 15 and 16, or the longitudinal axes thereof.

On the. bed superstructure 2 or on one of its side parts 3 two abutment elements 72*a* and 72*b* are arranged at a distance b from the telescopic tubes 15 and 16, i. e. the longitudinal axes thereof. The abutment elements 72*a* and 72*b* are arranged one over the other. They have a vertical distance c between them.

Figure 5:
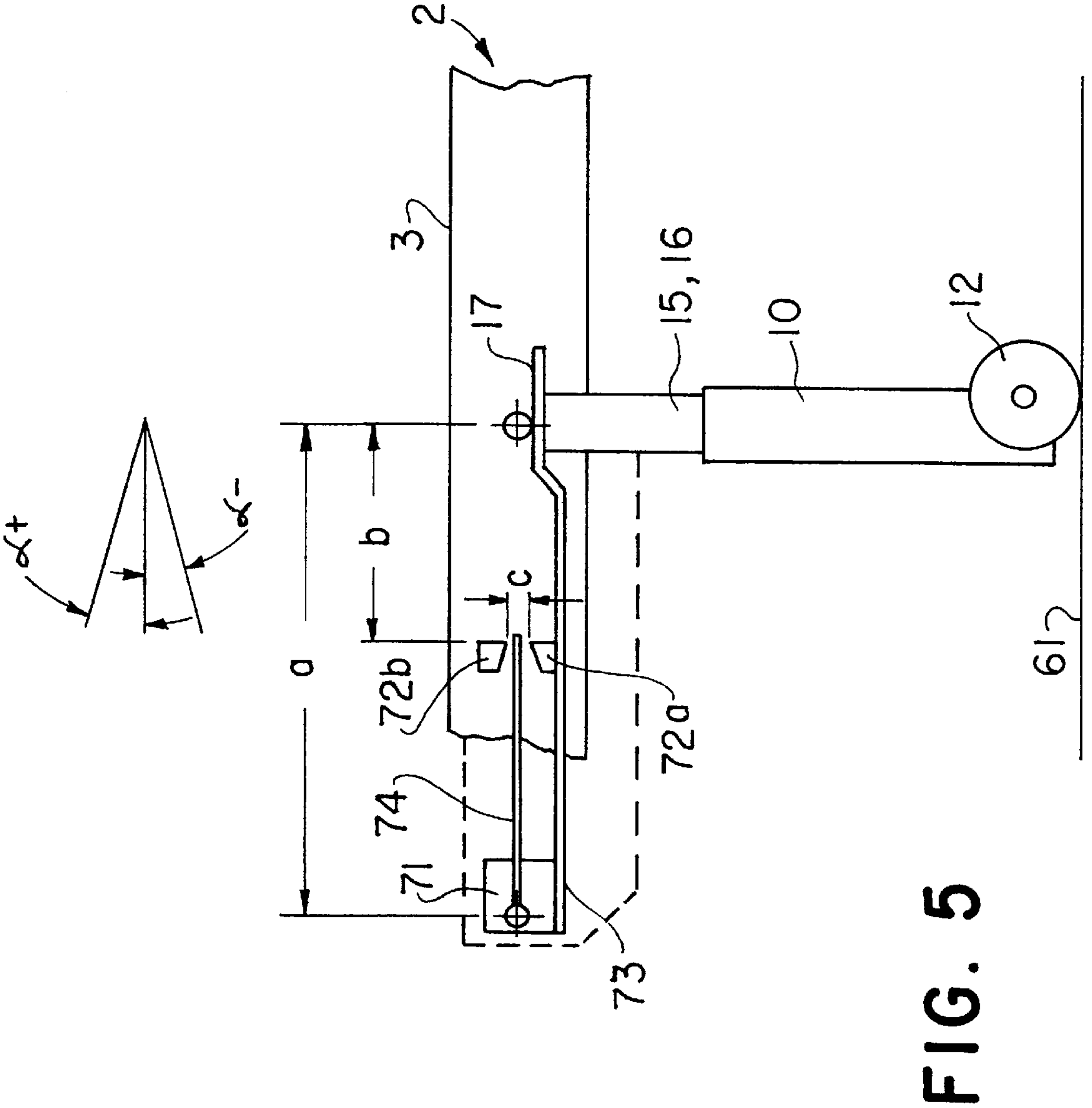
FIG. 5 shows a part of the hospital bed in a lateral elevation.
Figure 6:
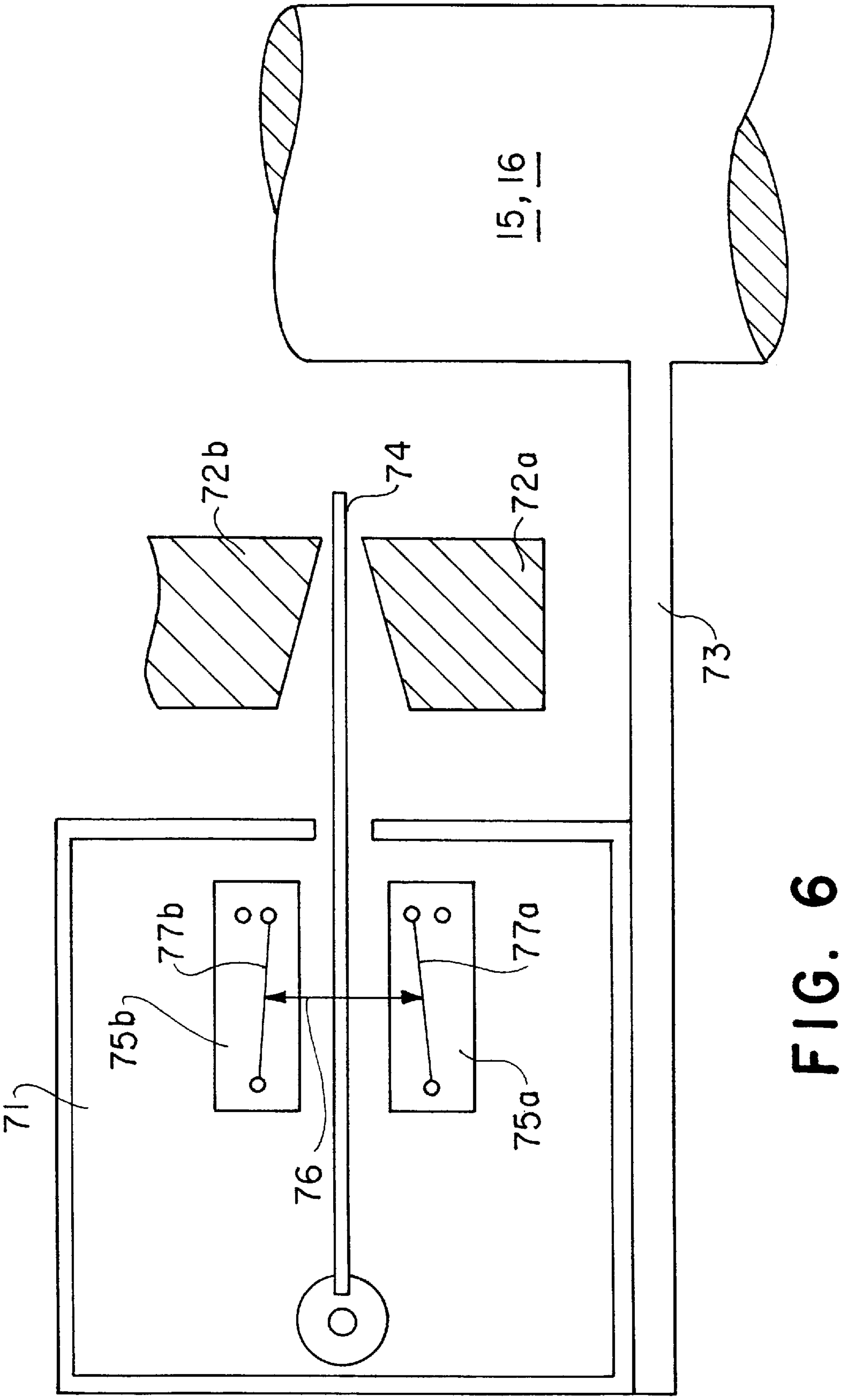
FIG. 6 is a view of part the structure of FIG. 5 on a larger scale.

The housing of the control device 71 is attached to a connecting rod 73 which extends from the transverse member 17 to the outer foot end of the bed. A resilient indicating element 74 extends from the housing of the control device 71 toward the middle of the bed. When the bed superstructure 2 is in a horizontal setting (see FIGS. 5 and 6) the inner end of the resilient indicating element 74 will be exactly in the middle between the two abutment elements 72*a* and 72*b*.

When the bed superstructure 2 is inclined, the setting of the indicating element 74 will not change. Accordingly the setting of the resilient indicating element 74 will initially remain unchanged. The bed superstructure 2 is however slanted in relation to the connecting rod 73, the control device 71 and the resilient indicating element 74. Therefore, dependent on the direction of slant, either the lower abutment element 72*a* or the upper abutment element 72*b* will strike against the inner end of the resilient indicating element 74. When the bed superstructure 2 is further sloped, the resilient indicating element will accordingly be moved upward or downward. Consequently one of the two switches 75*a* and 75*b* provided in the control device 71 will be operated. The switch 75*a* is located underneath the resilient indicating element 74, whereas the switch 75*b* is placed above this resilient indicating element 74. The resilient indicating element 74 is connected with an actuating part 76, which extends past the resilient indicating element 74 to either side in the vertical direction. The ends of the actuating part 76 engage switch elements 77*a* and 77*b* which are consequently switched over in a manner dependent on the direction of movement of the resilient indicating element 74.

The control device causes that drive motor to be stopped which is driving the part of the bed superstructure 2 which is leading in the respective direction of motion. If for example the bed superstructure 2 is slanted in the fashion illustrated in FIG. 1, and if the bed frame is to be moved upward, the control will have the effect that only the motor M1 will run and that the motor M2 is stopped. Accordingly only the head part, depicted in FIG. 1 on the left, of the bed will be moved upward. This will take place until the bed superstructure 2 is horizontal. As from this time onward both motors will be run so that the bed superstructure 2 is moved upward in the horizontal setting.

If the bed superstructure 2 is inclined as shown in FIG. 1 and if it is to be moved downward, the control device 71 has the effect that the electric motor M1 is halted so that the vertical setting of the head end of the bed is not changed. Furthermore the control device 71 has the effect that the motor M2 is operated to produce a downward movement so that the foot end of the bed superstructure 2 is moved downward. This control effect is maintained until the bed superstructure 2 is in a horizontal setting. As from this point both motors are operated to cause a downward movement of the bed superstructure.

If the bed superstructure 2 is slanted in the opposite manner to that illustrated in FIG. 1, that is to say if the head end is in the upper setting and the foot end is in the bottom position, a suitably reversed control effect is produced. Instead of stopping one motor, such motor may just be run at a lower speed. It is possible furthermore, instead of halting one motor to cause such motor to go on running at the same speed and to cause the other motor to run with a suitably higher speed. Furthermore the above mentioned possibilities may also be combined with each other. The simplest control is however produced if the drive motor, which is driving the part of the bed superstructure leading in the respective direction of motion, is halted and if the other drive motor is caused to run without any change in the speed thereof.

Figure 7:
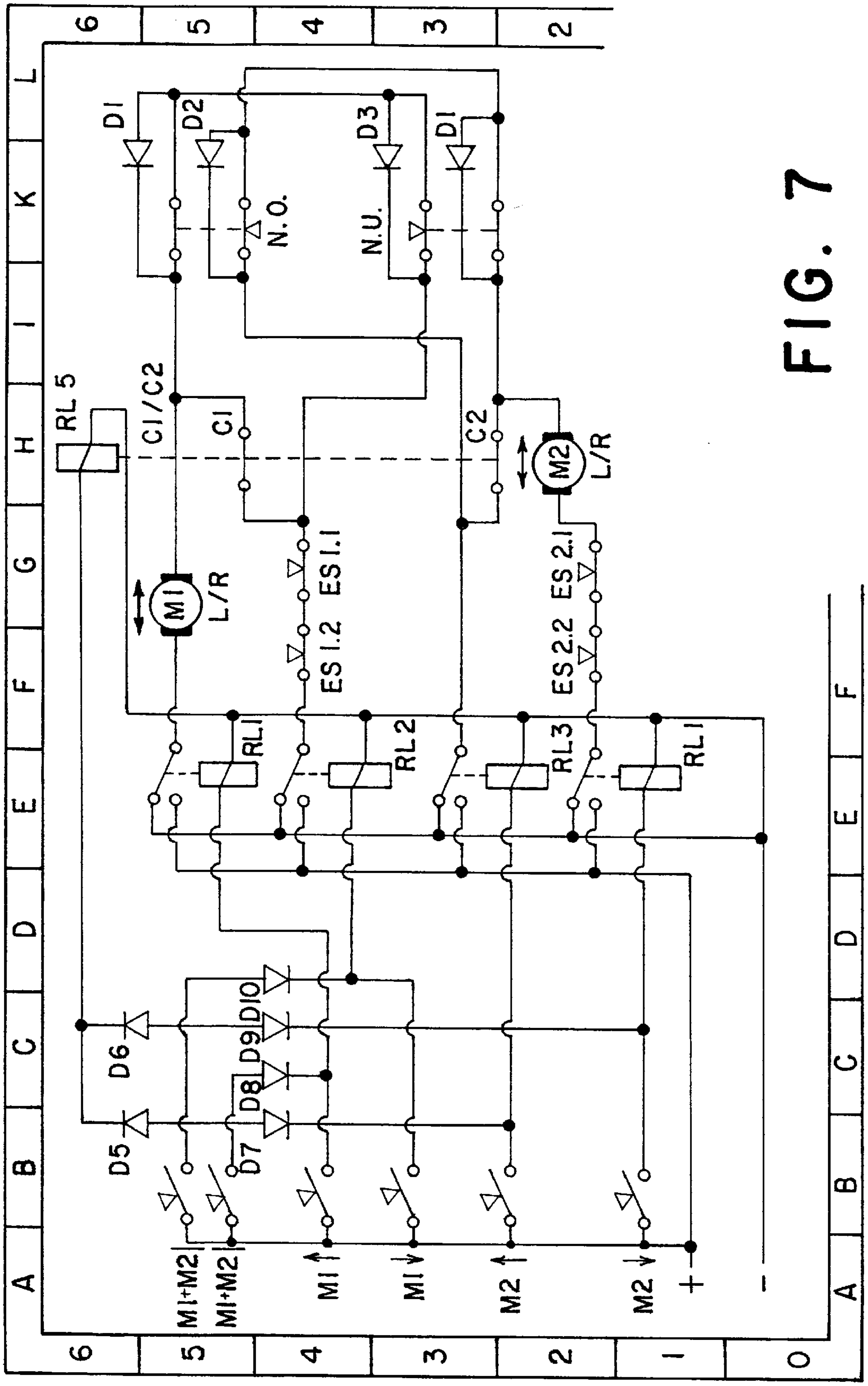
FIG. 7 shows a circuit diagram for the control of the vertical adjustment of the hospital bed.

One possible circuit diagram for such a control device is depicted in FIG. 7. The motors M1 and M2 are suitable for counter-clockwise and clockwise rotation and are able to be reversed. The two motors may be operated separately for upward or downward movement. They may also be operated jointly for sloping movement in the upward or in the downward direction. When the motor M1 is moved for causing upward movement the switch M1↑ is actuated and when the motor M1 is to be operated for causing downward motion, the switch M1↓ is operated. In an analogous fashion the motor M2 can be operated to cause upward or downward movement by operating the switch M2↑ or M2↓.

If both motors are to cause upward motion, the switch "M1+M2↑ " is operated. If both motors are to cause downward motion, the switch "M1+M2↓ " is operated.

All switches are connected on one side with the plus wire of a power supply. The other side of the switches is connected in the manner indicated in FIG. 7—partly via one or more diodes D7 through D10—with one or more of relays RL1 through RL4. Moreover the switches for operation of the motors M1 and M2 to cause movement in the same direction are joined via the diodes D5 and D6 with a further relay RL5, which opens on actuation of the switches C1 and C2. By opening the switches C1 and C2 the range with the diodes D1 through D4 and the switches N.O. and N.U. is activated. Instead of having switches it is also possible to provide reed contacts, photoelectric detectors, FET's or other sensors. The double switch N.O. (for upward motion) and N.U. (for downward movement) in FIG. 7 corresponds to the switches 77*b* and 77*a* in FIG. 6. The circuit parts with the double switches N.0. and N.U. and the diodes D1 through D4 ensure that that one of the drive motors M1 and M2 is halted, which is driving the part of the bed superstructure which is leading in the respective direction of movement.

Figure 8A:
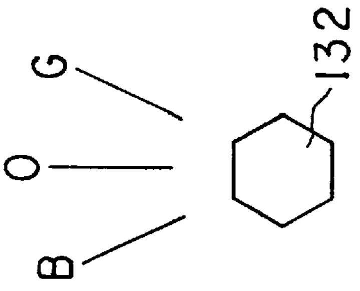
FIG. 8 shows a caster operated by a shaft with a clutch in a plan view.
Figure 8:
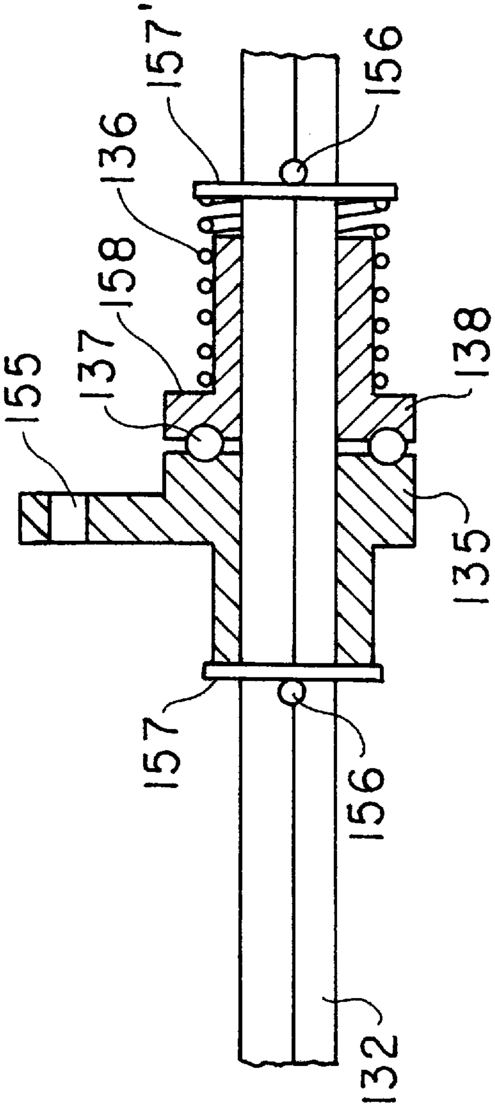
Figure 9:
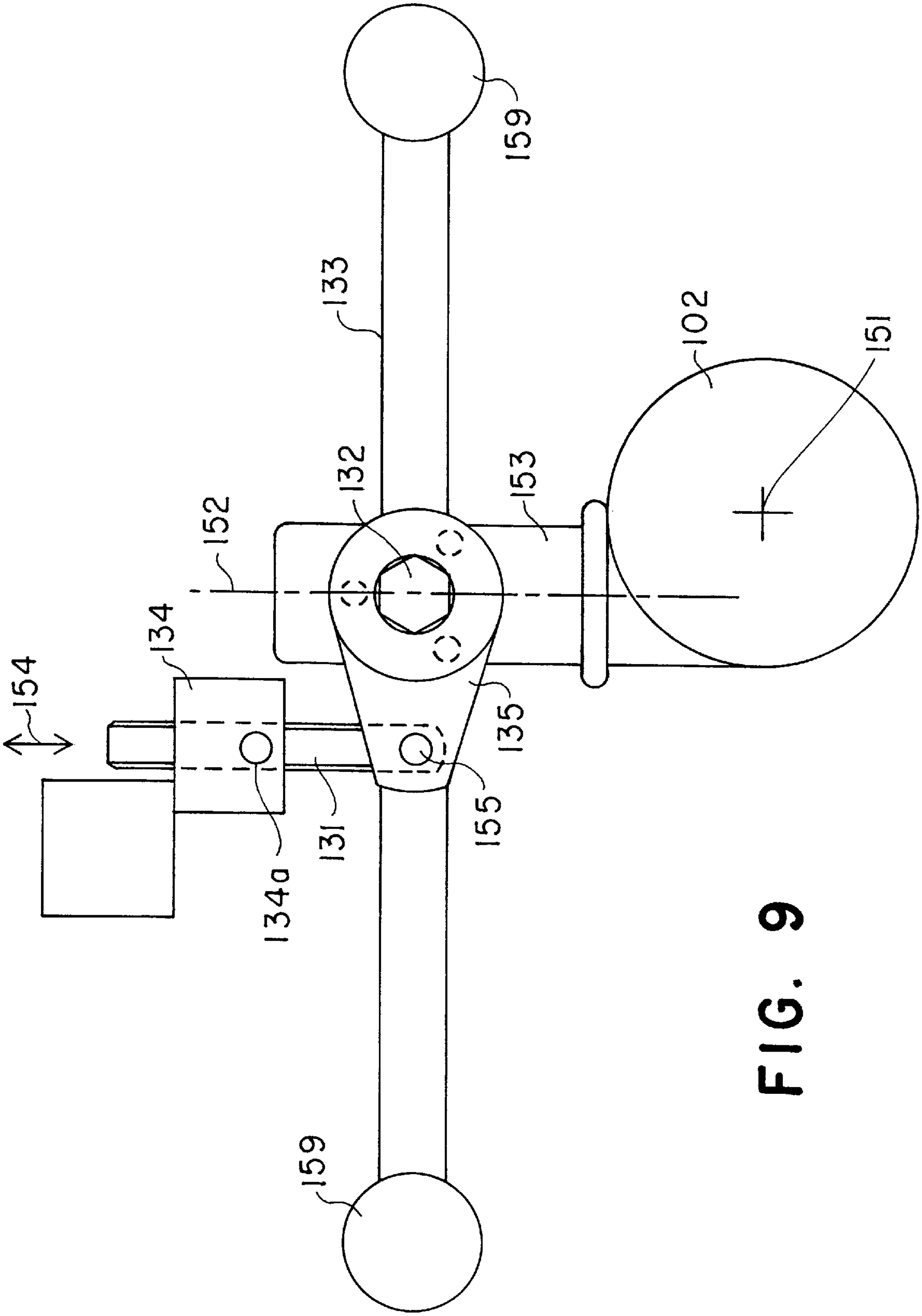
FIG. 9 shows the arrangement of FIG. 8 in a lateral elevation.

The caster 102 indicated in FIGS. 8 and 9 is connected with the bedstead. The caster 102 is able to be moved into a first setting (wheeling along) in which it is freely rotatable and into a locked setting in which it is locked or braked. In the freely wheeling setting the caster 10 is able to be freely rotated both about the horizontal pin 151 and also about the vertical pin 152.

The caster 102 is arranged on a caster housing 153, which has a shaft 132 extending through it. As shown in FIG. 9, the shaft 132 possesses a hexagonal cross section. The caster 102 is set in position by rotation of the shaft 132. If the shaft 132 is in the position "0" indicated in FIG. 9 on the right in the cross section, it is able to be freely turned. By rotation of the shaft 132 counter-clockwise into the setting marked "B" the caster is caused to be locked.

Furthermore the shaft 132 may be moved by clockwise turning into the setting "G" for straight ahead movement of the bed. In this setting a caster of the bed is moved into a setting, in which it is able to be wheeled along while remaining fixed in direction. In this setting free turning of the caster about the horizontal pin 151 is possible. Rotation of the caster about the vertical pin 152 is however locked in such a manner that the horizontal pin 151 extends perpendicularly to the longitudinal axis 121 of the bed so that the caster points in the longitudinal direction of the bed. The other casters of the bed are able to rotate freely, i. e. both about the pin 151 and also about the pin 152. Accordingly steady forward movement straight ahead of the bed is ensured.

The rotation of the shaft 132 and accordingly the setting of the casters 102 is performed by the motor 134. This motor 134 is designed in the form of a push or traction motor. The motor rod 131 connected with the motor 134 and moved by it is able to be moved in the direction of the double arrow 154. It is connected in an articulating fashion with the motor 134 by means of the pin 134*a*. The other end of the motor rod 131 is connected by the pin 155 with a flange of the hub 135 in an articulating manner.

Projections 156 are arranged on the shaft 132 with a spacing between them, against which disks 157 and 157' bear. On the caster housing 153 indicated on the left in FIG. 9 there bears a first hub 135. Between the first hub 135 and the other disk 157' a second hub 138 is provided, which has a ledge 158, against which a compression spring 136 bears, whose other end bears against the disk 157'. The hubs 135 and 138 have recesses in their facing sides, in which rolling bodies 137 in the form of balls lie. Owing to the resilient loading by the compression spring 136 the hubs 135 and 138 are braced toward one another.

The first hub 135 is not connected with the shaft 132 in such a manner as to prevent relative rotation. The second hub 138 is connected with the shaft 132 in such a manner as to prevent relative rotation while however allowing for axial displacement.

The double pedal 133 is connected with the shaft 132 in such a manner as to prevent relative rotation and axial movement. It possesses actuating members 159 at its ends, for example manufactured of rubber or provided with a rubber casing. By thrust against the actuating members 159 the shaft 132 may be shifted manually or using the foot. On actuation of the shaft 132 by the motor 134 the pedal 133 will move as well so that so that the respective setting of the casters 102 will be indicated by it.

The hubs 135 and 138 together with the rolling bodies 137 and the compression spring constitute a clutch. During normal operation the thrust of the motor rod 131 will be converted into a rotary movement of the firstly hub 135 about the shaft 132. This rotary motion is transmitted via the rolling bodies 137 to the second hub 138, which for its part transmits it to the shaft 132.

On operation of the shaft 132 by the pedal 133 the clutch in the form of the hubs 135 and 138 is disengaged. In this case the first hub 135 is in fact locked by the motor 134 and the motor rod 131. The torque exerted by the pedal 133 on the shaft 132 and which is transmitted to the second hub 138, is larger than the torque able to be transmitted by the rolling bodies 137 so that the rolling bodies 137 emerge from their recesses and move the second hub 138 against the force of the compression spring 136 away from the first hub 135. The second hub 138 can then move in relation to the first hub 135. During such rotary movement it will entrain the shaft 132 along with it with the result that the caster 102 is changed in its setting.

Figure 10A:
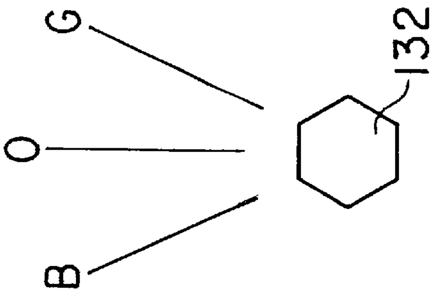
FIG. 10 shows a modified embodiment of the invention in a plan view.
Figure 10:
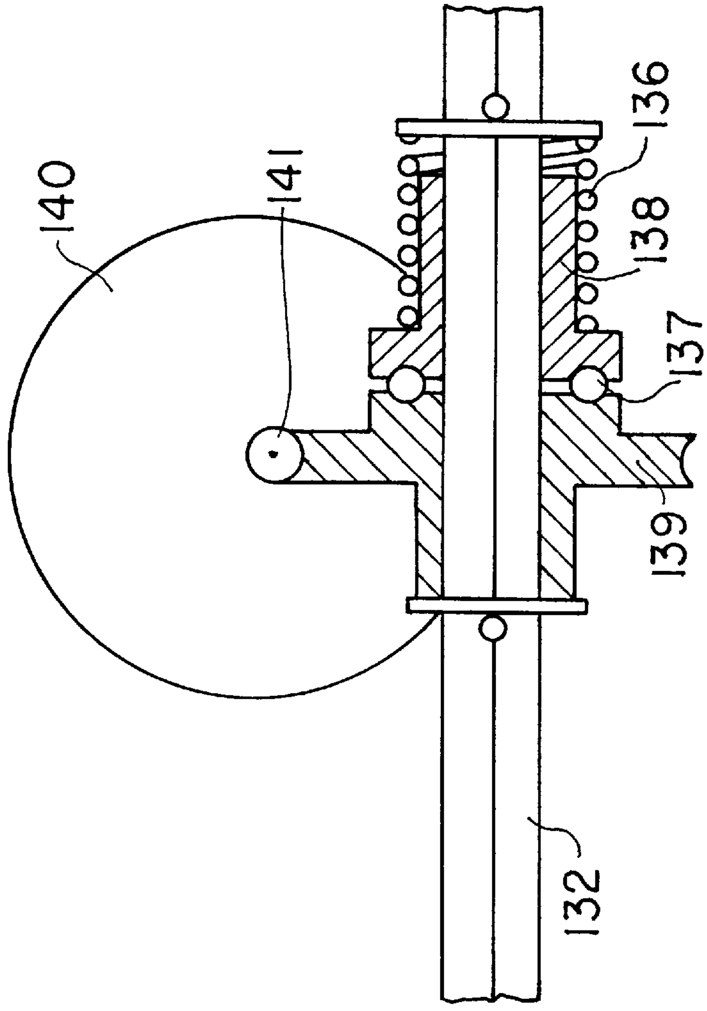
Figure 11:
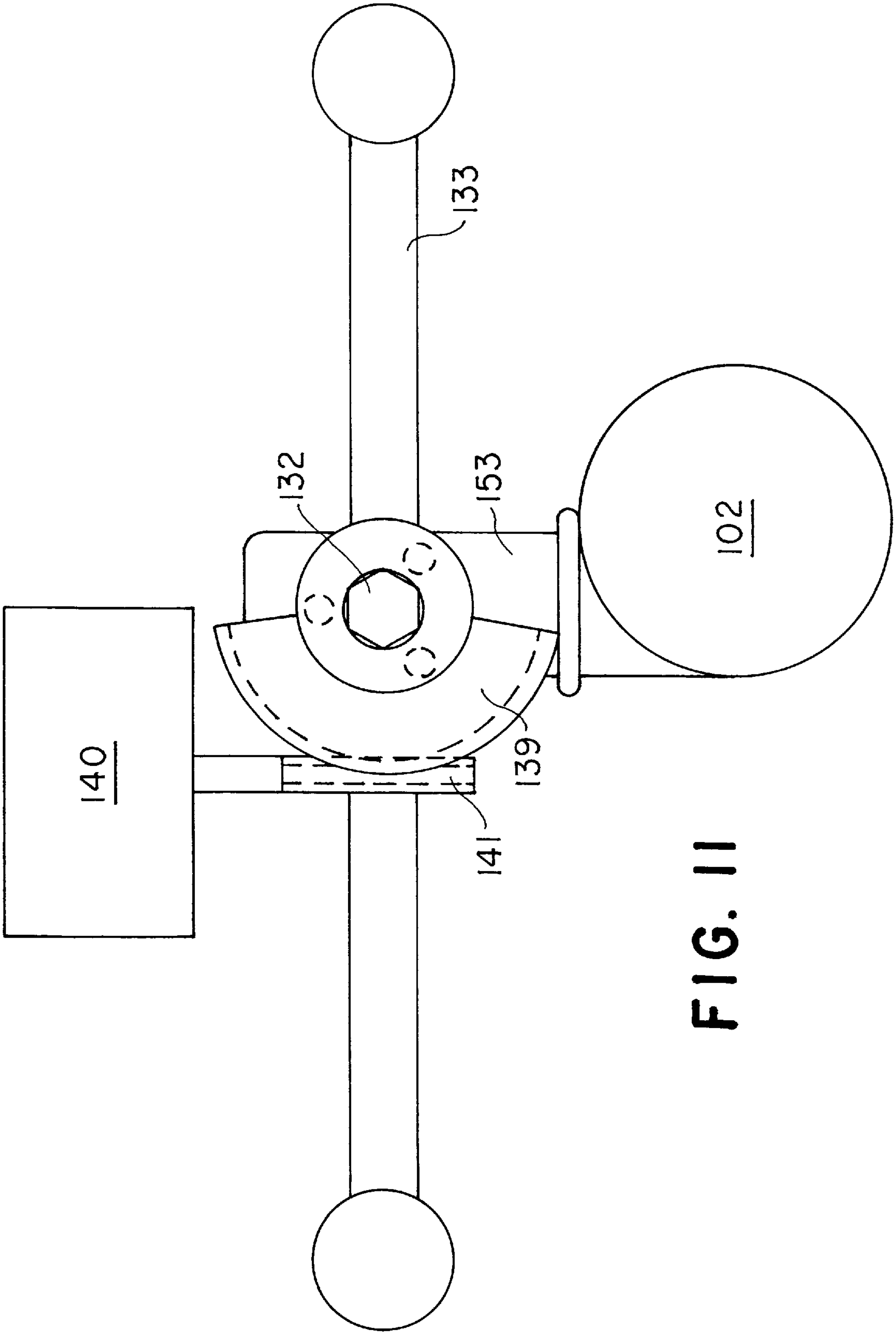
FIG. 11 shows the arrangement of FIG. 10 in a lateral elevation.

In the case of the modified embodiment illustrated in FIGS. 10 and 11 the transmission of force from the motor 140 to the first hub 139 is not via a motor rod, 131 but rather by means of a worm wheel drive, which comprises a worm 141 driven by the motor 140 and a worm wheel in mesh therewith and formed on the first hub 139. The hub 135 of the embodiment of FIGS. 8 and 9 is accordingly replaced by the hub 139, which at the same time is designed as a worm wheel or a worm wheel segment.

The setting of the shaft 132 is detected by means of a switch, not illustrated in the figure, or by sensors, which supply signals to the motor 134 or, respectively, 140, when the respectively desired switch setting is reached. Preferably three switches or sensors for the three switching positions O, B and G are set by means of the first hub 135 or, respectively, 139. The clutch may however be designed in some other manner, as for example in the form of radially disconnectable rolling bodies.

In the embodiment the disengagement function of the clutch is created by having axially disengeable rolling bodies or balls.

Figure 12:
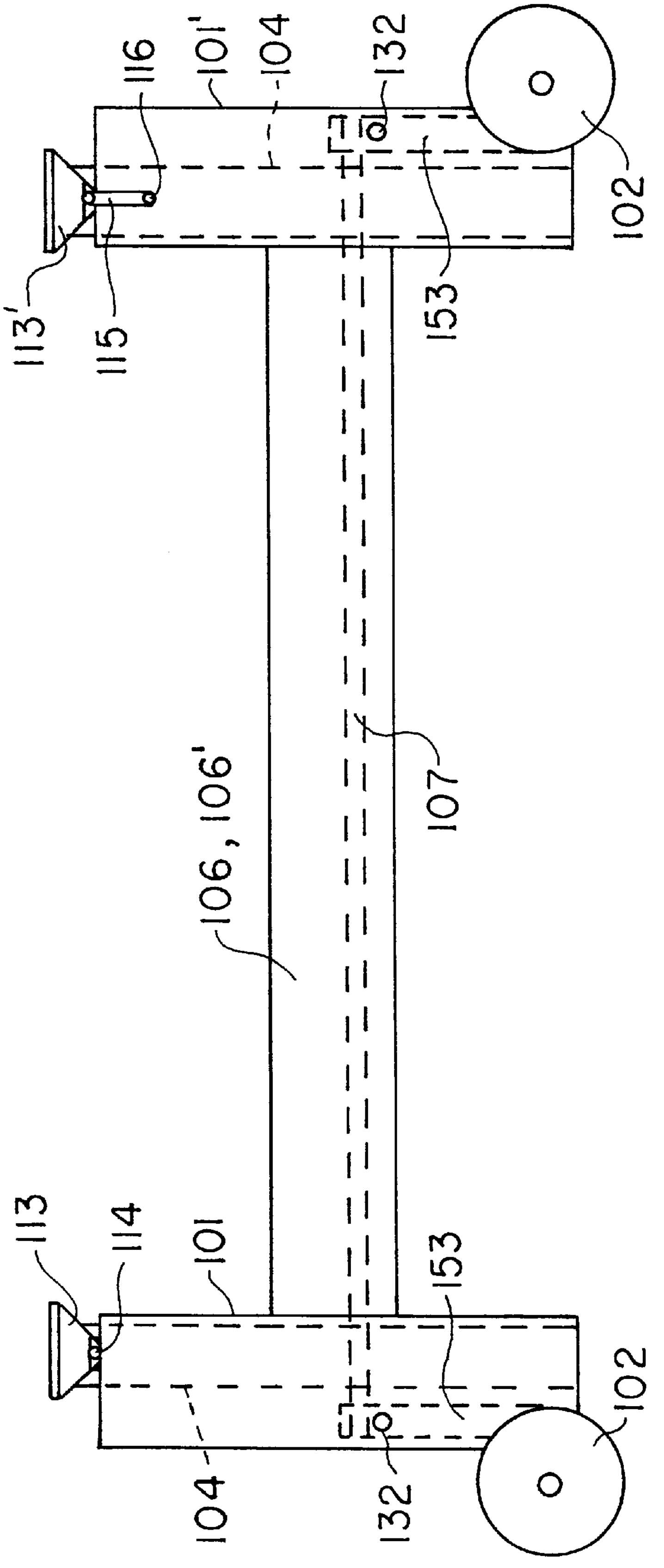
FIG. 12 depicts a further embodiment of a bedstead with casters in a lateral elevation.
Figure 13:
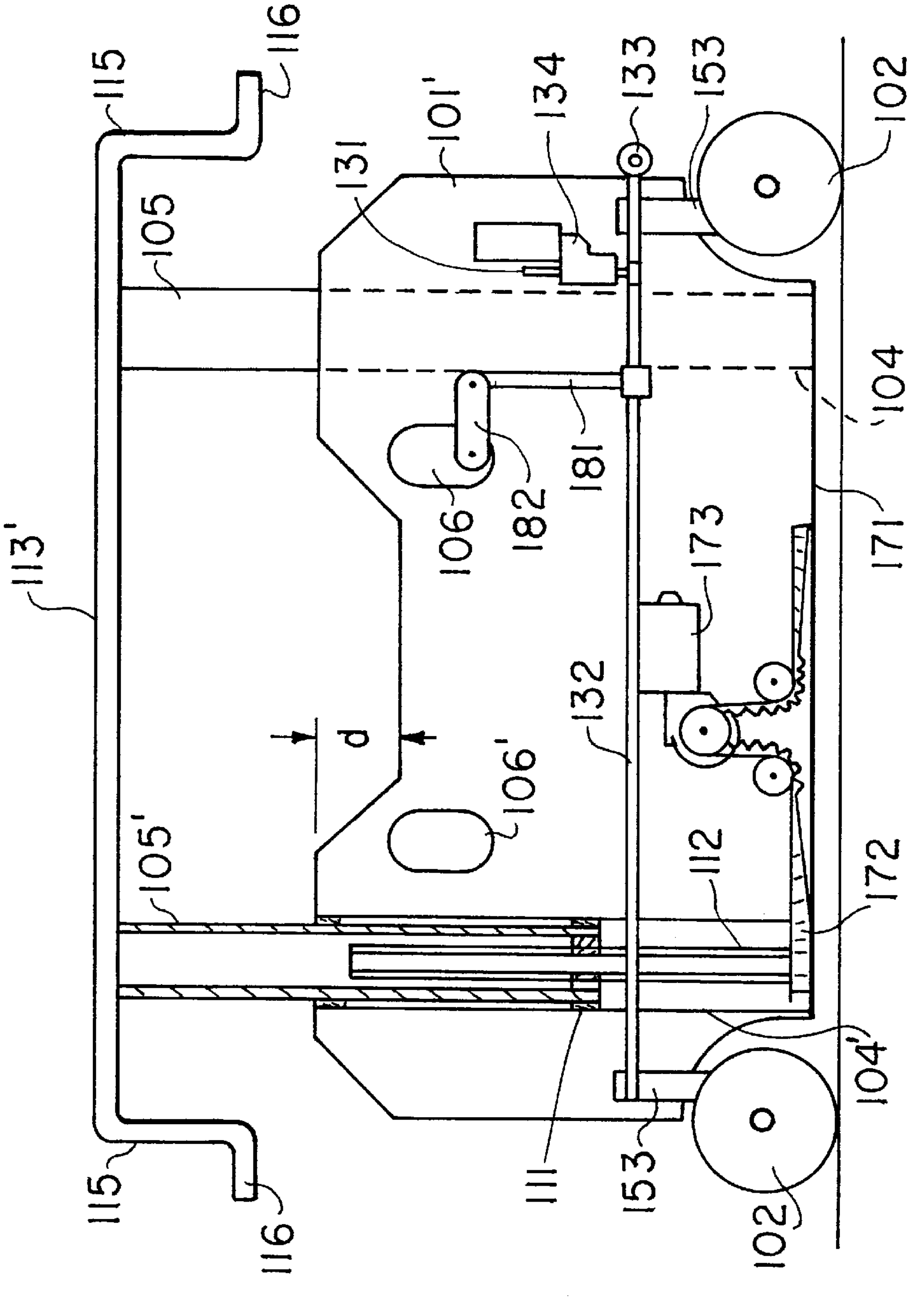
FIG 13 shows the bedstead of FIG. 12 in a front view with the telescoping rods extended upward.
Figure 14:
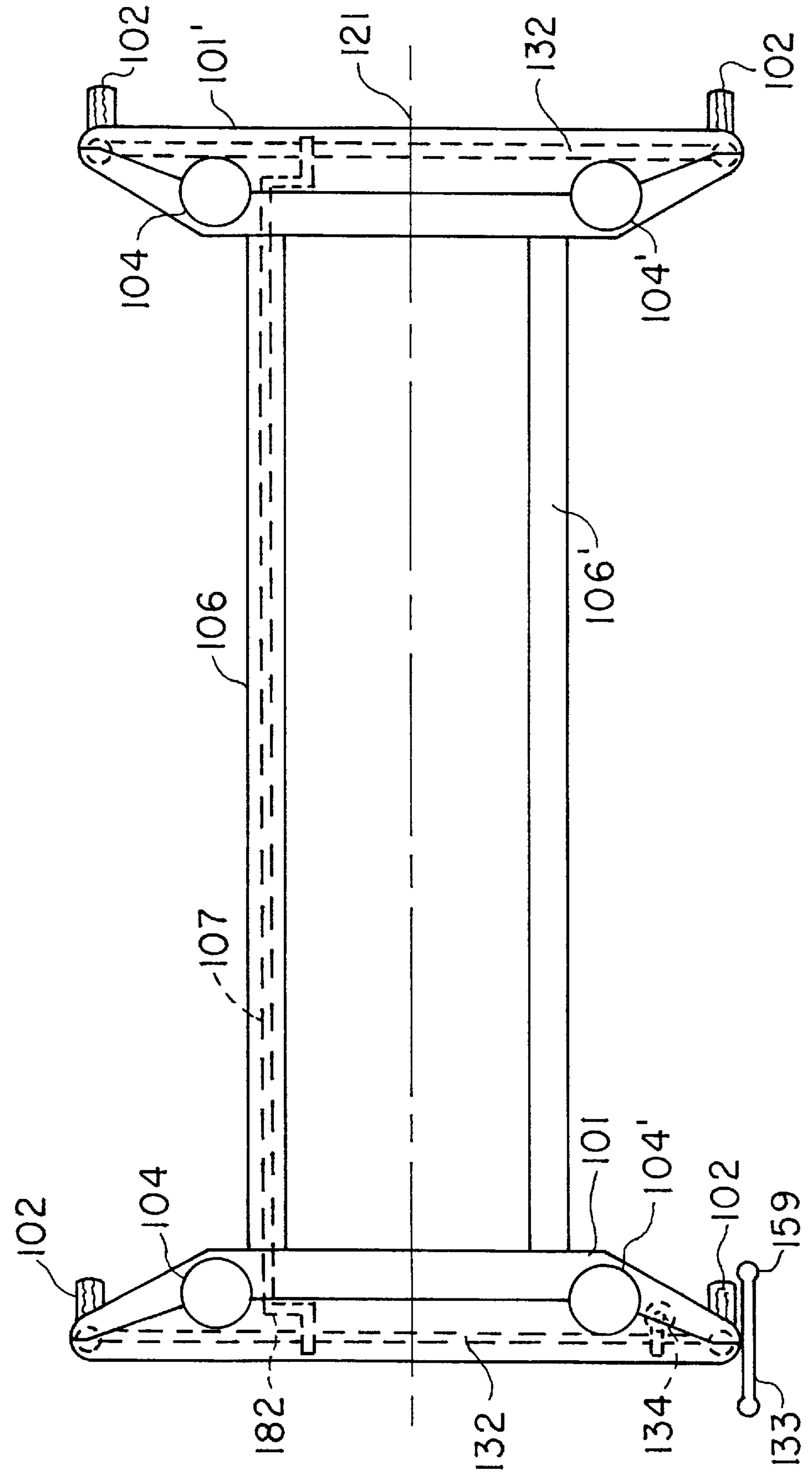
FIG. 14 shows the bedstead of FIGS. 12 and 13 in plan view.

The modified embodiment of the hospital bed depicted in FIG. 12 through 14 possesses a bedstead with casters 102 and a bed superstructure, not illustrated in the figures, mounted for vertical adjustment in height thereon, having a preferably adjustable bed frame. The bedstead comprises a first cast housing 101 at the foot end of the bed, a second cast housing 101' at the head end of the bed and furthermore a first connecting tube 106 and a second connecting tube 106'. The connecting tubes 106 and 106' extend at respectively the same height parallel to one another with a spacing between them. They extend furthermore substantially perpendicularly to the cast housings 101 and 101' or respectively perpendicularly to the line connecting two respective casters 102 of a cast housing. The connecting tubes 106 and 106' furthermore extend symmetrically in relation to the longitudinal center axis 121 of the bed.

In the middle of the cast housing 101 two vertical telescopic guides 104 and 104 are arranged extending substantially over the full height of the cast housings 101 and 101'. The cast housings 101 and 101' are, see more especially FIG. 13, in the region between the telescopic guides 104 and 104' lower than these telescopic guides by the amount d. The recess so formed and generally trapezoidal in shape is able to accept components connected with the bed superstructure during lowering of the bed superstructure and projecting downward, as for example components which are necessary for changing the position of the patient support frame. The telescopic guides 104 and 104' possess a circular cross section as indicated in FIG. 14. However, other cross sections would also be possible.

In the telescopic guides 104 and 104' a respective telescoping rod 105 and 105' is able to run longitudinally. At the upper ends of the telescoping rods 105 and 105' a bridge 113' is attached, with which the bed superstructure, not illustrated in the figure, is connected. In the middle of each telescopic guide 104 and 104' a respective lead screw 112 is provided whose lower end is axially fixed in the floor 171 of the housing 101' while being able to rotate therein.

The telescoping rod 105' (and also the other telescoping rods) which are designed in the form of telescoping tubes, has at its lower end a lead screw nut 111, accepting the lead screw 112 in it. Rotation of the lead screw 112 will cause a movement of the lead screw nut 117 downward and, respectively, upward.

In this respect the lead screw nut 111 is held to prevent it rotating since the telescoping rods 105 and 105' respectively connected with a nut are for their part joined together by the bridge 113'.

At their lower ends the two lead screws 112 in the cast housing 101' each possess a belt pulley driven by a toothed belt. The toothed belt 172 is driven by a drive motor 173. It is trained around various different bend pulleys and the pulleys of the two lead screws 112 and is in the form of a crossed toothed belt. The drive shaft of the drive motor 172 extends horizontally (parallel to the longitudinal axis 121 of the bed). Owing to the crossed arrangement of the toothed belt it is possible for both the two pulleys rotating about a vertical axis on the lead screws 112 to be driven by one drive motor 173 and a circulating belt 172.

Since the telescoping rods 105 and 105' at the head end and the foot end of the bed may be extended to different extend, length compensation of the points of attachment bed superstructure is necessary. At the foot end the bed superstructure is on the rotary bearing which is arranged at the ends of the bridge 113. The bridge 113' at the head end of the bed has rotary pitmans 115 at its ends, on whose lower ends perpendicularly extending, horizontal bearers 116 are provided, on which the bed superstructure rests adjacent to its head end. Owing to the rotary pitmans 115 length compensation is rendered possible for different degrees of extension of the telescoping rods 105 and 105' (if the bed is in the so-called “Trendelenburg” position).

The cladding parts designed in the form of cast housings 101 and 101' are shut off on all sides. All components necessary for actuation of the telescoping rods 105 and 105' and for changing the position of the casters 102 are arranged in the interior of the cast housing 101 and 101'. The second force transmitting element 107, which is constituted by a shaft, is arranged in the connecting tube 106.

As shown in FIG. 14 the telescoping rods and the telescopic guides 104 and 104' are outside the connection line between the associated casters 102. The casters 102 of the cast housing 101 are connected together by means of the shaft 132. The straight shaft 132 is on the straight lines connecting the casters 102. To ensure that this shaft 132 does not hinder the movement of the telescoping rods, the telescoping rods and with them the telescopic guides 104 and 104' are arranged clear of the shaft 132. In this respect the shaft 132 or, respectively, the connecting line between the casters 102 is on the side facing away from the middle of the bed of the telescoping rods or, respectively, the telescopic guides 104 and 104'. The same applies for the other cast housing 101'. In order to produce the offset between the shaft 132 and the telescoping rods or, respectively, the telescopic guides 104 and 104', the cast housing 101 (and for this matter the cast housing 101') is set at an angle which in the embodiment of the invention in FIGS. 12 through 14 amounts to approximately 15°.

The shaft 132 is fixedly attached to a lever, which in terms of FIG. 13 projects to the rear, connected in an articulating fashion with a vertical connecting level 181. The vertical connecting lever 181 has its upper end connected with a horizontal connecting lever 182 in an articulating manner, the other end of such lever 182 being fixedly connected with the second force transmitting element 107 in the form of a shaft. It is in this manner that rotary movement of the shaft 132 is converted into a rotary movement of the shaft 107. At the other end of the shaft the same lever mechanism is provided in order to convert the rotary motion of the shaft 107 into a rotary motion of the further shaft 132.

The above mentioned casters 102, which can be braked, are available from Colson Castors Limited, Hingley Road, Hallesowan, West Midlands B63 2RR, England, part order number 255 124 090 201 42. The caster 102, which may be additionally set in the straight ahead travel setting, is available from the same company, order number 255 134 090 401 42. Both types of casters are also available from TENTE-ROLLEN GmbH & Co., of Herrlinghausen 75, 42929 Wermelskirchen, Germany.

We claim:

1. A bed having a bedstead and having casters and a bed superstructure mounted in the bedstead in a vertically adjustable manner, with an adjustable bed frame comprising, part of the bed superstructure provided respectively with at least one telescoping rod which runs in an associated telescopic guide of the bedstead, a housing encircling the telescopic guide of the bed superstructure part, the housing being self-supporting, the housing being shut off on all sides, casters within the housing, and components for the telescoping rod within the housing.

2. The bed as claimed in claim 1, characterized in that the housing is an injection casting selected from a group including aluminum and magnesium.

3. The bed as claimed in claim 1, further comprising a head end for the part and a foot end for the part, said head and foot ends each being housed and said housing being connected together by at least one connecting part, the connecting part being in the form of a connecting tube.

4. The bed as claimed in claim 3, characterized in that the connecting part has a force transmitting element and casters set in said force transmitting element.

5. The bed as claimed in claim 1, characterized in that the bedstead casters establish a line therebetween, and the telescoping rod being clear of the caster established line.

6. The bed as claimed in claim 5, characterized in that the housing is angled in terminal parts thereof.

7. The bed as claimed in claim 1, characterized in that the part is provided with respectively two parallel, spaced telescoping rods, which are movable in associated telescopic guides of the bedstead, and casters, the casters spaced apart a distance that is greater than the spacing for the telescopic guides.

8. The bed as claimed in claim 7, characterized in that the telescoping rods of the head part are connected together by a respective transverse member.

9. The bed as claimed in claim 7, characterized in that the telescoping rods are provided each with a lead screw drive and a common toothed belt for driving the lead screw drive.

10. The bed as claimed in claim 7, characterized by a locking element for locking the casters.

11. The bed as claimed in claim 10, characterized in that setting members are arranged in the housing.

12. The bed as claimed in claim 11 having a motor for driving the setting members.

13. The bed as claimed in claim 10, characterized in that the setting members are arranged in the housing.

14. The bed as claimed in claim 7, characterized in that the telescopic guides extend substantially over the full height of the housing and the housing between the telescopic guides is lower than the telescopic guides by a predetermined amount.

15. The bed as claimed in claim 7, characterized in that the telescoping rods of the foot part are connected together by a respective transverse member.

16. The bed as claimed in claim 7, characterized in that the telescoping rods of the head part and the foot part are connected together by respective transverse members.

17. The bed as claimed in claim 1 having casters, the casters being adapted to be moved into a first position in which they are able to be freely turned and in a second position in which they are locked.

18. The bed as claimed in claim 17, characterized in that at least one caster is able to be moved into a third position in which the caster can be turned but keeps to a given set direction.

19. The bed as claimed in claim 20, characterized by an actuating part for manually changing the setting of the casters.

20. The bed as claimed in claim 19, characterized by having an actuating part and a first force transmitting element connected with the actuating part.

21. The bed as claimed in claim 20, wherein said first force transmitting element further comprises a shaft.

22. The bed as claimed in claim 18, characterized in that a first force transmitting element is connected with two casters.

23. The bed as claimed in claim 18, characterized in that the part of the bed has a head end and a foot end, each have a respective caster which casters are connected together by a first force transmitting element and in that the two first force transmitting elements are connected together by means of a second force transmitting element.

24. The bed as claimed in claim 23, wherein the force transmitting elements further comprise shafts.

25. The bed as claimed in claim 18, further comprising a shaft for a first force transmitting element.

26. The bed as claimed in claim 17, having a motor and in which the casters are movable into a third position in which the casters can be turned but keep to a given set direction.

27. The bed as claimed in claim 1, characterized in that the housing is angled in its terminal parts.

* * * * *